(12) United States Patent
Fenton

(10) Patent No.: US 7,299,814 B2
(45) Date of Patent: Nov. 27, 2007

(54) METHOD AND APPARATUS FOR SELECTIVELY SHUTTING OFF THE FLOW OF WATER TO A BUILDING

(76) Inventor: John A. Fenton, 4201 SW. Jay Ave., Pendleton, OR (US) 97801

( * ) Notice: Subject to any disclaimer, the term of this patent is extended or adjusted under 35 U.S.C. 154(b) by 271 days.

(21) Appl. No.: 11/149,563

(22) Filed: Jun. 9, 2005

(65) Prior Publication Data
US 2006/0048821 A1 Mar. 9, 2006

Related U.S. Application Data

(60) Provisional application No. 60/608,484, filed on Sep. 8, 2004.

(51) Int. Cl.
*F16K 17/20* (2006.01)
(52) U.S. Cl. .......................... 137/1; 137/341; 137/357; 137/460; 137/614.12
(58) Field of Classification Search ............... 137/341, 137/460 I, 614.12, 357, 1
See application file for complete search history.

(56) References Cited

U.S. PATENT DOCUMENTS

| | | | |
|---|---|---|---|
| 2,359,338 A | 10/1944 | Tyden | |
| 3,559,197 A | 1/1971 | Jarvis et al. | |
| 3,621,865 A | 11/1971 | Baggaley | |
| 3,749,864 A | 7/1973 | Tice | |
| 3,761,657 A | 9/1973 | Miller | |
| 3,877,524 A * | 4/1975 | Glenn, Jr. ................... | 137/460 |
| 4,197,809 A | 4/1980 | Johnson | |
| 4,614,122 A | 9/1986 | Graves | |
| 4,791,254 A | 12/1988 | Polverari | |
| 4,797,666 A | 1/1989 | Baxter et al. | |
| 4,797,820 A | 1/1989 | Wilson et al. | |
| 4,807,661 A * | 2/1989 | Lewis et al. ................. | 137/456 |
| 4,868,566 A | 9/1989 | Strobel et al. | |
| 4,880,030 A | 11/1989 | Terry | |
| 4,906,807 A | 3/1990 | Siebert et al. | |
| 5,034,648 A | 7/1991 | Gastgeb | |
| 5,049,860 A | 9/1991 | Farrell et al. | |
| 5,183,983 A | 2/1993 | Knop | |
| 5,189,911 A | 3/1993 | Ray et al. | |
| 5,971,011 A * | 10/1999 | Price ........................... | 137/460 |
| 6,032,540 A | 3/2000 | Hawkins | |
| 6,209,576 B1 | 4/2001 | Davis | |
| 6,338,279 B1 | 1/2002 | Tsataros | |
| 6,374,846 B1 * | 4/2002 | DeSmet ................... | 137/15.01 |
| 6,510,748 B2 | 1/2003 | Cooper | |
| 6,516,826 B2 | 2/2003 | Allen | |
| 6,548,775 B1 | 4/2003 | Edwards | |
| 6,708,722 B1 | 3/2004 | Goodenough | |

(Continued)

OTHER PUBLICATIONS

Pending U.S. Appl. No. 11/451,754, filed Jun. 12, 2006.

*Primary Examiner*—Stephen M. Hepperle
(74) *Attorney, Agent, or Firm*—Klarquist Sparkman LLP

(57) ABSTRACT

Embodiments disclosed herein relates in part to selectively shutting off the flow of water through a water supply pipe to a building, such as in the event of a broken water pipe. The embodiments disclosed herein also optionally discontinue electrical power to a water heater to minimize the risk of water heater elements burning out in the event a water heater is at the risk of being drained of water, such as due to a broken water pipe.

29 Claims, 3 Drawing Sheets

U.S. PATENT DOCUMENTS 6,730,927 B1 5/2004 Smith et al.
2003/0117289 A1* 6/2003 Uhler .................... 340/606
2004/0031523 A1* 2/2004 Zeng .................... 137/460

* cited by examiner

METHOD AND APPARATUS FOR SELECTIVELY SHUTTING OFF THE FLOW OF WATER TO A BUILDING

CROSS REFERENCE TO RELATED APPLICATION

This application claims benefit of Provisional Patent Application No. 60/608,484, filed on Sep. 8, 2004. The entire disclosure of the provisional application is considered to be part of the disclosure of the following application and is hereby incorporated by reference herein.

TECHNICAL FIELD

The technology disclosed herein relates in part to selectively shutting off the flow of water through a water supply pipe to a building, such as in the event of a broken water pipe. The technology also relates to optionally discontinuing electrical power to a water heater to minimize the risk of water heater elements burning out in the event a water heater is at risk of being drained of water, such as due to a broken water pipe.

SUMMARY

Electrical heating elements from hot water tanks are known to fail and require replacement as a result of such heating elements continuing to be energized following loss of water in the water tank. It would be desirable, in accordance with certain embodiments, to shut off the power to a water heater in the event of the occurrence of conditions that may have drained the water from the water heater. Additionally, for some individuals, such as the elderly, it can be difficult to shut off the water supply to a house or other building in the event of a broken water pipe. For example, standard water shutoffs utilize valves that require manipulation to turn them off and can be difficult for some individuals to access and/or operate. It is desirable, in accordance with certain embodiments, to enable a non-tradesman to shut off water in a safe manner prior to calling for assistance. Service calls for plumbing assistance can be reduced in duration by providing, in accordance with certain embodiments, an easily accessible and operable shutoff for a water source that can be activated by, for example a plumber, during a plumbing repair. Also, in accordance with certain embodiments, by automating the shutoff of a water supply in the event of excessive water usage, indicative of a broken water pipe, the risk of a potentially huge amount of water damage and possible mold growth can be reduced in the event of a broken pipe. The water supply can also be shut off in the event of the undesirable back flow of water to, for example, reduce the risk of drainage of water from a water heater.

DETAILED DESCRIPTION

The disclosure below describes a number of embodiments of apparatus and methods relating to controlling the shut off of water to a building upon the occurrence of certain events. These embodiments are also disclosed in combination with shutting off the electrical power to a water heater under certain conditions in the event of the flow of water to the building being interrupted. Although such constructions are desirable, it should be noted that the water flow control features may be implemented without the water heater power control features, if desired. In addition, various combinations and sub-combinations of features and elements disclosed herein, may be utilized. My invention encompasses all novel and non-obvious combinations and sub-combinations of features and method acts disclosed herein and is defined by the claims below and does not require that any or all advantages disclosed herein be realized. Also, terms such as "a" are to be given broad construction to include one or more elements. Thus, if two or more of a given element are present, the requirement of "a" or "an" element is also met by the presence of two of such elements. Also, the word "includes" is to be broadly construed to have the same broad open-ended meaning as the word "comprises". Also, the term "coupled" or "coupling" includes the direct connection as well as indirect connection through one or more other elements. Also, elements may be separate standalone elements or combined with other elements even though, for convenience, they are described below as either standalone or combined. Finally, the examples and embodiments discussed below are not to be taken as limiting the scope of the invention.

Figure 1:
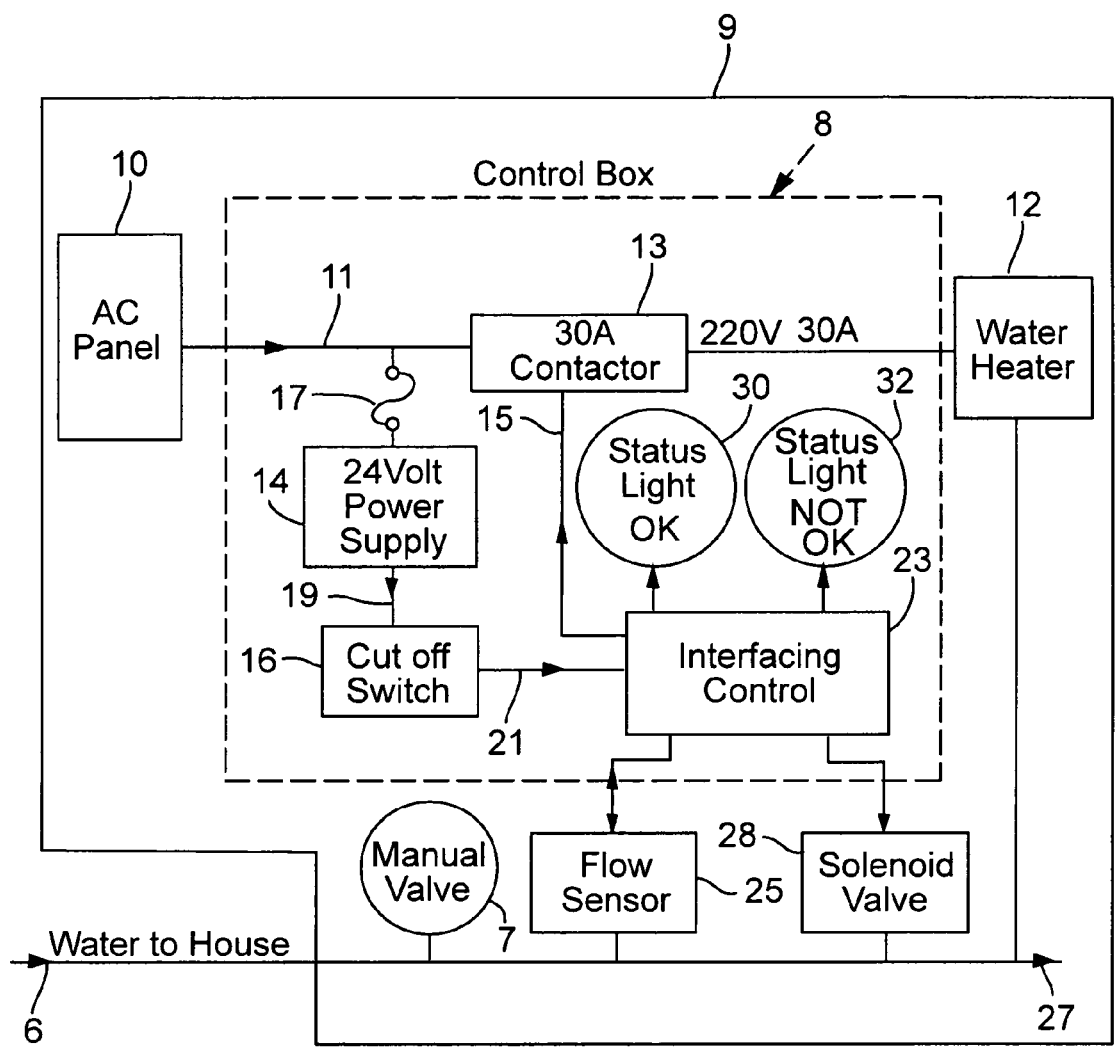
FIG. 1 is a block diagram of one embodiment of an apparatus in accordance with an embodiment.

With reference to FIG. 1, an electrical control box or housing 8 is shown wired in a position to control the delivery of power in an AC line between a conventional fuse/breaker box 10 of a building, such as a residence or house 9, and an electrical water heater 12 of the residence. A power line, such as a 220 volt alternating current supply protected by 30 amp fuses is indicated by line 11 and passes through control box 8. A conventional electrically controlled 30 amp breaker or contactor 13 is interposed in line 11 and is controlled via signals from a control line 15. Power from line 11 (e.g., from a 110 volt phase thereof) is delivered through a fuse 17 to a transformer (not shown) within a power supply 14 that operates to provide output power at a desired voltage level such as 24 volt DC power on line 19. Line 19 is connected in this embodiment to a manually operable cutoff switch 16 having an output 21 to an interfacing control 23. The control 23 is connected via line 15 to contactor 13. In addition, a flow sensor 25 is coupled to interface control 23.

Flow sensor 25 is operable to sense the flow of water in a water supply line or pipe 6 to the residence or other building. A manually operated shutoff valve 7 is also provided to permit manual control of the flow of water in line 6. Valve 7 may be, for example, inside or outside of the building and is typically positioned near where the water supply pipe enters the building. Although various types of flow sensors may be used, in one specific example, the flow sensor 25 may comprise one or more commercially available flow sensors.

A specific exemplary flow sensor desirably comprises a three position flow stick positioned in water supply line 6. A first or neutral position of the flow stick corresponds to no water flowing in line 6. A second or forward flow position corresponds to water flow in the direction of arrow 27, a normal flow direction, into the building. The water flows through pipe 6 to various water usage locations and appliances, such as water heater 12, hose bibs, sinks, toilets, ice makers, sinks and the like. In addition, flow sensor 25, in this example, has a third back flow indicating position corresponding to abnormal water flow in a direction opposite to arrow 27. Other forms of flow sensors may be used. For example, a device that only detects forward flow may be used in the event back flow detection features are eliminated. As another example, first and second two position flow sensors may be used with neutral and forward flow positions. By orienting one of these flow sensors in a reverse orientation, its forward flow position will actually detect back flow. Exemplary flow sensors are commercially available from Aqualarm of Chula Vista, Calif. (e.g., model 360LS).

Flow sensor 25, in this example, provides one or more electrical flow detection indicating signals to interfacing control 23, in this example, corresponding to the position of the flow stick of the flow sensor. The interface control 23 is also coupled to a water flow control valve 28, such as a solenoid controlled valve, that is selectively operable to shutoff (interrupt) or permit the flow of water in line 6 depending upon whether the valve is closed or open. Although other water flow valves may be used, one specific form of valve comprises a pulse activated solenoid valve that switches position (e.g., closed to open or open to closed) in response to the application of an electrical signal pulse to the valve. For example, assuming this exemplary form of solenoid valve 28 is in an open flow permitting position, upon delivery of an operating electrical pulse (a form of valve closing signal) to the solenoid of valve 28, the solenoid valve is caused to close. When the solenoid of valve 28 is again subjected to an operating electrical pulse (e.g., a form of valve opening signal), the valve 28 is caused to open. The solenoid valve of this example repetitively switches between open and closed positions in response to the operating pulses.

Status indicators, such as lights 30,32, desirably visible from the face of the control box 8, may be included to indicate the condition of the system. For example, one or more green lights may be on, as indicated by status light "okay" block 30 in FIG. 1, in the event solenoid valve 28 is open and electrical power is being supplied to water heater 12. In contrast, light 30 may be "off" and one or more "no okay" status lights, such as red lights, as indicated by block 32 in FIG. 1, may be on if either the valve 28 is closed or power is interrupted to the water heater, or both.

In operation of the FIG. 1 embodiment, assume there is a drop in water pressure due, for example, to a broken water pipe. In this case, cutoff switch 16 (which is one form of a manual actuator) may be manually operated to a shutoff position. In response to a corresponding electrical signal from the cutoff switch, interface control 23 sends a pulse to solenoid valve 28 causing the valve 28 to close the water supply line 6 to the building. In addition, in this embodiment, a signal from interface 23 is sent via line 15 to contactor 13 causing the contactor to open to thereby shut off power to the electrical water heater. This prevents the water heater elements from burning out in the event the water heater drains due to the broken water pipe. If the bypass switch 16 is returned to its on position, contactor 13 again closes, re-energizing the water heater and a pulse is sent to solenoid valve 28 causing the valve to open to thereby permit the water to flow in line 6. In the event a plumbing repair is needed, the plumber can move switch 16 to its shut off position, resulting in de-energization of the water heater elements and closing of the valve 28. The switch position can be reversed after the repair is completed.

In systems where an optional water flow sensor, such as sensor 25, is included, and this is desirable, the water flow can be monitored by the interface to determine whether excessive water use has occurred. For example, forward water flow can be monitored to determine whether the water has been on for an excessive period of time. For example, the duration of time that a flow stick remains in the forward flow position can be monitored to see if an "excessive water flow time" threshold is reached or exceeded. This threshold or "water flow" period of time may be preset, for example at four hours. This period of time may also be variable, but again is more typically preset in advance. The threshold may be adjusted and then preset to the adjusted level. In the event a signal from flow sensor 25 indicates forward flow of water in line 6 (in the direction of arrow 27) for a time in excess of the threshold, excessive water flow is indicated. In this event, the interface control sends a signal to solenoid valve 28 causing the valve to close and shut off the source of water to the building. In addition, the interface control desirably also sends a signal via line 15 to contactor 13 causing the contactor to open to shut off the power to the water heater elements. In the event of water flow in the reverse or backflow direction (opposite to arrow 27), flow sensor 25 detects this backflow of water and sends a backflow indicating signal to interfacing control 23. Prior to closing the valve under back flow conditions, back flow for a period of time that meets or exceeds a threshold (e.g., at least at the threshold) may be required. This backflow threshold may be preset, varied and adjusted such as previously described for the forward flow direction. In response, the valve may be operated to shut off the valve and water supply to the building and power to the water heater may be interrupted as previously described.

An alternative embodiment of an exemplary apparatus will next be described with reference to FIGS. 2 and 3.

Figure 2:
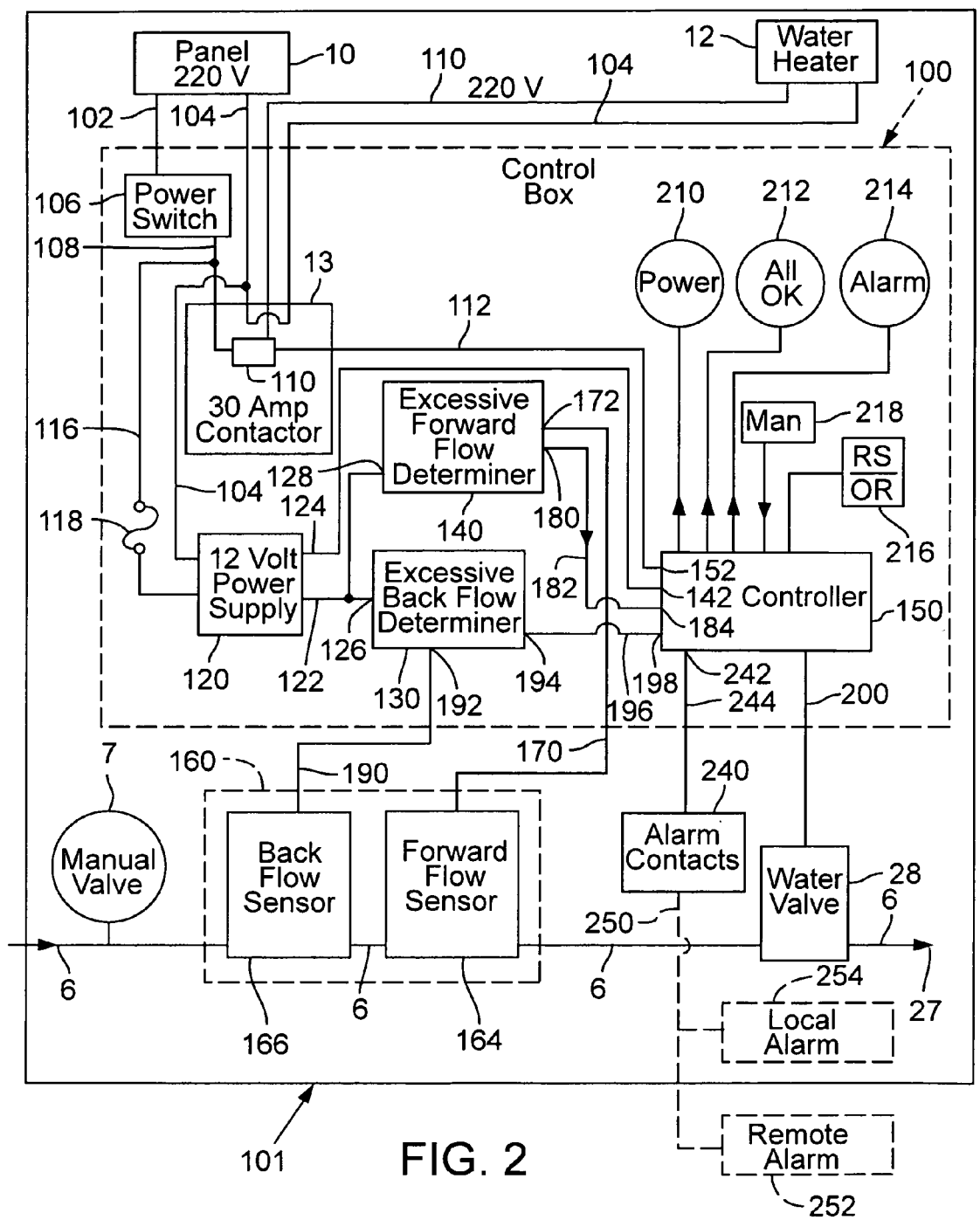
FIG. 2 is a block diagram of an alternative embodiment.

With reference to FIG. 2, an alternative form of electrical control box 100 is shown wired in a position to control the delivery of power in an AC line between a conventional fuse/breaker box 10 of a building 101 and an electrical water heater 12 for the building. In FIG. 2, numbers in common with some of the numbers shown in FIG. 1 have been used for similar components. A power line, such as a 220 volt alternating current supply 102 protected by 30 amp fuses in the panel 10 enters the control box 100. The neutral 104 is also shown in this figure. The two-phase hot leg wires along line 102 may be turned on and off by a conventional power switch or breaker 106 in control box or housing 100 to electrically isolate the control box from panel 10. Bypass switches (not shown) may be used to selectively couple water heater 12 directly to the panel 10 if desired. From power switch 106, the two-phase 220 volt power passes through a conventional electrically controlled 30 amp breaker or contactor 13. More specifically, two-phase power lines 108 pass through contacts 110 that are controlled by signals from a control line 112. When contacts 110 are closed, the two-phase power is delivered via a line 110 to the water heater 12. Power to water heater 12 can be shut off in this embodiment by opening the contacts 110 of contactor 13. Conversely, power to the water heater 12 may be turned on by closing the contacts 110. Power from lines 108 (e.g., from a 120 volt phase thereof) is delivered via line 116 and through a fuse 118 to a transformer (not shown) within a power supply 120 that operates to provide output power at a desired voltage level, such as 12-volt DC power on respective output lines 122,124. Line 122 is coupled to respective power inputs 126,128 of a respective excessive backflow determiner 130 and an excessive forward flow determiner 140. In addition, power from power supply 120 is delivered via line 124 to a power input 142 of a controller 150, an example of which is explained below. The illustrated form of controller 150 has an output 152 to which the line 112 is coupled to provide control signals from the controller to the contactor 13. For example, a 5-volt signal may be delivered from controller 150 to contactor 13 whenever the contacts 110 of contactor 13 are to be opened.

A flow sensor 160 is shown for sensing the direction of water flow in waterline 6. Normal flow in line 6 is indicated again by the direction arrow 27. Although other forms of flow sensors may be used, such as previously described, flow sensor 160 comprises a forward flow sensor 164 and a backflow sensor 166. As specific examples, and not by way of limitation, an exemplary forward flow sensor is an FPT Model 306-LF-CPVC one inch not low flow sensor from Aqualarm of Chula Vista, Calif. In addition, an exemplary backflow sensor can comprise a pressure switch loop that determines a reduction in pressure, corresponding to backflow of water through line 6. An exemplary backflow sensor is a pressure switch gauge No. 7-100/switch-DC from Irrometer Company, Inc., of Riverside, Calif.

In the event sensor 164 senses forward flow of water in line 6, a signal (e.g., a 5-volt signal) is provided from sensor 164 via line 170 to an input 172 of the excessive forward flow determiner 140 for the duration of the time that the forward flow of water is sensed. In one specific example, excessive forward flow determiner can comprise a timer that commences timing upon receipt of the appropriate signal at input 172 with timing continuing while the signal is present. A forward flow threshold can be preset. The forward flow time threshold can be varied or adjusted. As a specific example, the threshold may be set in the range of from three to eight hours with one specific example being a four hour predetermined threshold time. If the timer times out (e.g., the threshold is reached indicating that forward flow of water has been continuously detected for four hours in this example) an excessive forward flow signal is provided at output 180 from the excessive forward flow determiner 140 and via line 182 to an input 184 of the controller 150. In response, as explained below, the controller can control the closing of the water flow control valve 28 and thus the flow of water in water pipe 6 to thereby shut off the excessive forward flow. In addition, the controller can provide a power shut off signal at output 152 and via line 112 to contactor 113 to cause power to water heater 12 to be shut off under such excessive forward flow conditions.

In the event backflow of water is detected in line 6, e.g., by sensor 166, a backflow detection signal (e.g., 5-volt signal) is provided via line 190 to an input 192 of the excessive backflow determiner 130. Excessive backflow determiner can operate in the same manner as excessive forward flow determiner. For example, excessive backflow determiner may be a timer that commences timing upon receipt of the backflow indicating input signal at input 192. Excessive backflow determiner in one form is operable to provide an excessive backflow indicating output signal at 194 and via line 196 to an input 198 of the controller in the event backflow is detected for a period of time determined by the timer of this exemplary excessive backflow determiner. The time may be a predetermined time and may be varied or adjustable. For example, backflow detection of from one second to one minute with a narrower range of from three to six seconds can be taken as a reliable indicator of undesirable backflow of water in water line 6. Other parameters, such as discussed above, may be detected and used to determine backflow. As a specific example, Velleman T/N No. K8015 timer kits from Velleman Company of California may be used both for the excessive forward flow determiner 140 and the excess backflow determiner 130.

Upon receipt of an excessive backflow signal at input 198 from the excessive backflow determiner 130, the exemplary controller 150 is operable, as explained below, to cause water valve 28 to close to thereby block or interrupt the flow of water in water line 6 (e.g., the backflow of water in this case). In addition, controller 150, via a control signal on line 112 to contactor 13, desirably causes the shutoff of power to the water heater 12. Valve control signals from the controller 150 via line 200 are provided to control the operation of the illustrated water valve 28.

A plurality of indicator lights can be provided, for example at the face of the housing or control box 100. Exemplary indicator lights (ground wires not being shown in these figures) comprise a power indicating light 210 which, when lit, indicates that power is being provided to the controller 150. A normal operation or "all okay" indicator light 212 can be provided to indicate the system is operating in a normal mode with power being supplied to water heater 12 and valve 28 being opened to permit the flow of water along line 6. An "alarm" or not okay indicator light 214 can also be provided to indicate that valve 28 has been closed and that power has been shut off to water heater 12.

It should be noted that, although less desirable, power to water heater 12 may not be controlled with the control being limited to controlling the flow of water through line 6 to interrupt the flow in the event of excessive forward water flow, excessive backflow water, or, most desirably, excessive flow in both direction determinations. In addition, the system can be operable to automatically recheck for continued backflow or forward flow, e.g., often a period of time with the system being reinitialize the system to an "all okay" condition if backflow or forward flow is no longer detected. This is less desirable than the example in which resetting is required in the event either excessive forward flow or excessive backflow is determined before the system is reinitialized.

As shown in FIG. 2, the exemplary apparatus also includes a reset or override actuator, such as a switch 216 that is, for example, manually actuated to provide a signal to the controller which then causes the reopening of valve 28 and reestablishment of electrical power to the water heater 12 following an excessive forward flow or excessive backflow determination. In addition, a manually actuated switch 218 is desirably provided. Switch 218 when actuated provides a signal to a controller resulting in the controller operating to cause water valve 28 to close and can also cause the shutting off of power to the water heater 12. Thus, switch 218 can operate like cutoff switch 16 to provide a convenient way for someone to turn off the water to the building without having to locate and operate a manual valve 7 that may be at the street, underneath the house, or at some other inconvenient location.

The apparatus illustrated in FIG. 2 also comprises optional alarm contacts or notification circuitry 240. In the event of alarm conditions (e.g., controller has caused water valve 28 to close and power to the water heater to be shut off due to excessive water forward flow or backflow) a signal can be provided from an output 242 via a line 244 to the alarm contact circuit 240. The alarm contact circuit can provides an alarm signal via a connection 250 (which may be hard-wired, e.g., a cable or telephone line or a wireless or satellite connection) to, for example, a remote alarm detecting location 252. In addition to or alternatively, for example, an e-mail or text message can be sent to the owner's computer, cell phone or internet connecting phone to alert the owner. As another example, location 252 may be (in addition to or alternatively) a security company's offices which remotely monitors burglar and other alarms and which has been set up for monitoring water conditions at a building in which the apparatus 100 is installed. In response to the detection of the remote alarm, the alarm monitoring company can send out a plumber or other inspector for the purposes of determining the source of the problem (e.g., a broken pipe) so that cleanup can commence before, for example, significant damage from is caused by standing water. In addition, the alarm contacts 240 may be coupled to a local alarm 254 such as a strobe light, siren or other alarm indicator at the building (or exterior thereof) itself.

Figure 3:
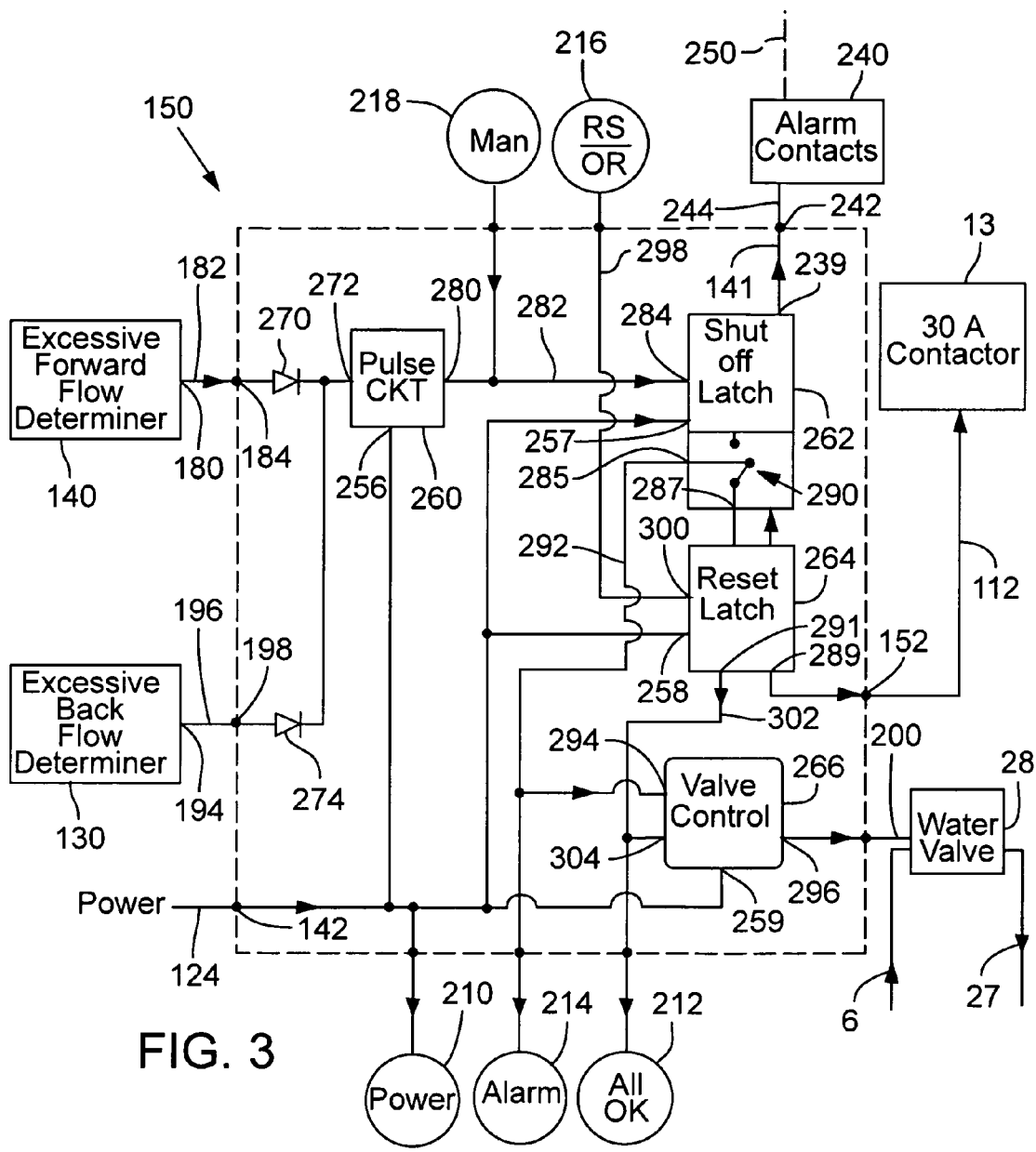
FIG. 3 is a block diagram of an exemplary controller that can be used in the FIG. 2 embodiment of the apparatus.

An exemplary embodiment of a suitable controller 150 or flow monitoring circuit is shown in FIG. 3. In the controller of FIG. 3, power from line 124 delivered to input 142 of the controller 150 and is delivered via various conductors to power inputs 256,257,258 and 259 respectively of a pulse circuit 260, a shutoff latch 262, a reset latch 264 and a valve control 266. The excessive forward flow indicating signal from line 182 is delivered to input 184 of controller 150 through a diode 270 and to an input 272 of the pulse circuit 260. In addition, the excessive backflow indicating signal from line 196 is delivered to input 198 of the controller 150 and through a diode 274 and to the input 272. Under normal operating conditions (no excessive forward flow determination and no excessive backflow determination), the output 280 from pulse circuit 260 along line 282 to an input 284 of shutoff latch 262 is at a level which causes the shutoff latch to remain in an unlatched state. The shutoff latch is indicated functionally as including a switch 290. Under these conditions, the switch 290 is open such that the value of the voltage signal from an output 285 of shutoff latch 262 via line 292 to an input 294 of the valve control 266 is at a low level and the alarm light 214 (coupled to line 292) is de-energized. Also, the water heater contactor 13 is closed (due to the level of the signal at an output 289 of reset latch 264) so that power is supplied to the water heater.

In contrast, in the event an excessive forward flow determination or excessive backflow determination is made, the output 280 from pulse circuit 260 changes state resulting in the delivery of an excessive water flow signal to input 284 of shutoff latch 262. In response, switch 290 shifts position, resulting in a change in the voltage of the signal (e.g., it assumes a high voltage level such as twelve volts DC) along line 292 to the valve control 266 and also resulting in power to the alarm indicating light 214. Under such conditions, an alarm indicating signal is delivered from latch output 239, via conductor 241 and output 242 of the controller via line 244, to the optional alarm contacts 240. In addition, a high voltage level signal is provided from shut off latch output 287 to reset the latch 264 causing the delivery of a signal at reset latch output 289 and via controller output 152 via line 112 to contactor 13. This results in turning off of the electrical power to the water heater. The voltage at reset latch output 291 also drops, resulting in turning off of "all okay" light 212 and a reduction in the voltage at input 304 to valve control 266 to a low voltage (e.g., zero voltage) level. The illustrated valve control circuit 266 may be a comparator that produces a positive output voltage when the voltage at input 294 is greater than the voltage at input 304 and a negative output voltage when the voltage at input 304 is greater than the voltage at input 294. In this case, with the changes in voltages at inputs 294,304 to the valve control circuit 266 a positive level voltage is provided from output 296 via line 200 to the water valve causing the valve to close. The valve may be a pulse activated valve which stays in the position to which it is shifted until a subsequent change in polarity of the actuating signal is received. For example, a Model 210 electric valve from Bermad of Anaheim, Calif. is one example of a suitable valve 28.

Upon actuation of the reset or override switch 216, a reset signal is provided via a line 298 to an input 300 of the reset latch 264, causing the switch 290 to shift back to the position shown in FIG. 3. When this occurs, the signals at 294,304 switch state so that valve control 266 provides a valve control signal at output 296 of a reverse polarity (negative) and the water valve 28 changes state (opens in this case). Also, upon resetting, the reset latch 264 provides a reset signal at output 289 and via line 112 to contactor 13, causing the contactor to close and repower the water heater. In addition, the signal via line 292 to the alarm light 214 is no longer high and the alarm light becomes unlit. Also, the signal at output 291 changes and is provided along a line 302 from the reset latch 264 to light 212 to cause light 212 to light up and indicate that conditions are acceptable. In addition under such conditions the signal from shut off latch 262, via output 239, line 241, connection 242 and line 244 to the alarm contacts 240 changes state so that the lack of an alarm condition is indicated.

Manual switch 218, when actuated to a shutoff position provides a pulse on line 292 that matches the level of the output pulse at 280 corresponding to water and power shutoff conditions. In this case, the shutoff latch 262 operates in the same manner as if excessive forward flow or excessive backflow had been determined. In this way, the manually actuated cutoff switch 218 may be used to shut off power to the water heater and to shut off the supply of water if desired. These conditions are then reversed by switching the manual switch to its unactuated state. Alternatively, the manual cutoff switch 218 may simply provide a pulse on line 282 to cause the above operation of the apparatus with the switch 218 then automatically returning to its unactuated state. In this case, the water valve and power will remain closed and power will remain off until the reset or override switch is again actuated. Switches 216 and 218 may be pushbutton switches. Also, the circuitry may be modified such that an alarm signal to alarm contacts 240 is blocked in the event the switch 218 has been actuated to shut off the water and power.

Assume that one of the above described embodiments is installed in a rental or vacation home and that a pipe freezes and breaks. In this case, the occupant will be able to easily shut off the water by operating switches 16 or 218 and power to the water heater will be turned off. This minimizes the risk of water damage to the rental unit and the risk of damage to the water heater until such time as a plumber is called. As another example, assume one of the above-identified embodiments has been installed in a vacation home or other building that is vacant for extended periods of time. In this case, if a broken water pipe occurs, the water will be shut off and power to the water heater disabled after excessive forward water flow or back flow is detected, such as after a time period of continuous forward or back water flow. Also, with this apparatus, it is easy to shut off the water and power to the water heater simply by operating the switches 16 or 218 in the event the building is to be vacant for a period of time (e.g., in the case of an infrequently used vacation home).

Having illustrated and described the principles of my invention with reference to exemplary embodiments, it should be apparent to those of ordinary skill in the art that the invention may be modified in arrangement and detail without departing from the inventive principals. I claim all such modifications as fall within the scope and spirit of the disclosed technology.

I claim:

1. For use in a building having a water supply pipe through which water is supplied to this building, water flowing in a first forward direction through the water supply pipe when water is being used in the building, the direction opposite to the first forward direction being a second backflow direction, an apparatus for selectively interrupting the flow of water through the water supply pipe comprising:

at least one flow sensor for detecting flow of water at least in the first of the first and second directions, the sensor providing a water flow output indicating signal corresponding to the direction of water flow;

a flow monitoring circuit coupled to the at least one flow sensor so as to receive the water flow output indicating signal, the flow monitoring circuit being adapted to provide a valve close signal in the event water flow in at least the first direction exceeds a first forward flow threshold; and in the event water flow is in the second backflow direction is equal to or exceeds a second backflow threshold;

wherein the first forward flow threshold is greater than the second backflow threshold; and a valve coupled to the flow monitoring circuit and adapted to interrupt the flow of water through the water supply pipe in response to the valve close signal.

2. An apparatus according to claim 1 wherein the second backflow threshold and the first forward flow thresholds are different time thresholds with the first forward flow threshold being greater than the second backflow threshold.

3. An apparatus according to claim 1 for use in a building having an electric water heater that is supplied with electrical power from an electrical panel and supplied with water from the water supply pipe, the apparatus comprising an electrical switch that, in response to a power off signal, is adapted to shut off the electrical power to the water heater, the flow monitoring circuit being coupled to the electrical switch and being adapted to provide the power off signal to the electrical switch at least in the event the flow of water through the water supply pipe in the backflow direction is equal to or exceeds the second backflow threshold.

4. An apparatus according to claim 1 for use in a building having an electric water heater that is supplied with electrical power from an electrical panel and supplied with water from the water supply pipe, the apparatus comprising an electrical switch that, in response to a power off signal, is adapted to shut off the electrical power to the water heater, the flow monitoring circuit being coupled to the electrical switch and being adapted to provide the power off signal to the electrical switch in the event the flow of water through the water supply pipe has been interrupted in response to the valve close signal.

5. An apparatus according to claim 1 comprising a manually actuated actuator operable to generate a valve close signal upon manual actuation, the valve being coupled to the manually actuated actuator and responsive to the generation of the valve close signal upon such manual actuation to interrupt the flow of water through the water supply pipe.

6. An apparatus according to claim 1 comprising a reset actuator adapted to generate a reset signal upon actuation, the flow monitoring circuit being coupled to the reset actuator and the valve also being coupled to the reset actuator, the flow monitoring circuit being responsive to the reset signal to reset the flow monitoring circuit to the condition at which water flow in the first direction is equal to or exceeds a first forward flow threshold and water flow in the second direction is equal to or exceeds a second back flow threshold has not been determined, the valve being operable in response to the reset signal to open the valve so as to no longer interrupt the flow of water through the water supply pipe.

7. An apparatus according to claim 1 comprising a remote alarm signal generator for providing an alarm signal to a location remote from the building indicating the interruption of the water flow by the valve in response to the occurrence of water flow in the first direction being equal to or exceeding the first forward flow threshold.

8. An apparatus according to claim 7 comprising a manually actuated actuator operable to generate a valve close signal upon manual actuation, the valve being coupled to the manually actuated actuator and responsive to the generation of the valve close signal upon such manual actuation to interrupt the flow of water through the water supply pipe.

9. An apparatus according to claim 4 wherein the first and second thresholds are each time thresholds.

10. An apparatus according to claim 9 wherein the first and second thresholds are predetermined.

11. An apparatus according to claim 10 wherein the first and second thresholds are adjustable.

12. An apparatus according to claim 10 wherein the first threshold is between three and eight hours and the second threshold is between one second and one minute.

13. For use in a building having a water supply pipe through which water is supplied to this building, water flowing in a first forward direction through the water supply pipe when water is being used in the building, the direction opposite to the first forward direction being a second backflow direction, the building having an electric water heater that is supplied with electrical power from an electrical panel and supplied with water from the water supply pipe, an apparatus for selectively interrupting the flow of water through the water supply pipe comprising:

at least one flow sensor for detecting flow of water at least in the first of the first and second directions, the sensor providing a water flow output indicating signal corresponding to the direction of water flow;

a flow monitoring circuit coupled to the at least one flow sensor so as to receive the water flow output indicating signal, the flow monitoring circuit being adapted to provide a valve close signal in the event water flow in at least the first direction is equal to or exceeds a first forward flow threshold;

a valve coupled to the flow monitoring circuit and adapted to interrupt the flow of water through the water supply pipe in response to the valve close signal;

wherein the at least one flow sensor detects the flow of water in the first and second directions, the flow monitoring circuit also being adapted to provide a valve close signal in the event water flow in at least the second direction is equal to or exceeds a second back flow threshold;

the apparatus further comprising an electrical switch that, in response to a power off signal, is adapted to shut off the electrical power to the water heater, the flow monitoring circuit being coupled to the electrical switch and being adapted to provide the power off signal to the electrical switch in the event the flow of water through the water supply pipe has been interrupted in response to the valve close signal;

wherein the first and second thresholds are each time thresholds;

wherein the flow monitoring circuit comprises an excessive forward flow determiner circuit for receiving a water flow output signal from the at least one flow sensor corresponding to forward flow of water, the excessive forward flow determiner monitoring the duration of time during which forward flow of water continuously exists, the excessive forward flow determiner providing a first excess forward flow signal corresponding to the first forward flow threshold when the duration of the continuous forward flow of water at least equals the forward flow threshold;

the flow monitoring circuit also comprising an excessive backflow determiner circuit for receiving a water flow output signal from the at least one flow sensor corresponding to backflow of water, the excessive backflow determiner monitoring the duration of time during which backflow of water continuously exists, the excessive backflow determiner providing a second excess backflow signal corresponding to the second backflow threshold when the duration of the continuous back flow of water at least equals the back flow threshold; and the flow monitoring circuit also comprising a controller circuit coupled to the excessive forward flow determiner circuit and to the excessive backflow determiner circuit for receiving the respective first excessive forward flow signal and second excessive backflow signal, the controller being coupled to the valve and being operable to provide the valve close signal in the event water flow at least in the first direction exceeds the first forward flow threshold and in the event water flow in the second direction exceeds the second backflow threshold.

14. An apparatus for selectively interrupting the delivery of power from an electrical panel to an electric water heater and for controlling the flow of water through a building water supply pipe, the apparatus comprising:

a flow direction detector adapted to determine the direction of flow of water in the water supply pipe in a first forward direction and in a second backflow direction;

a flow direction determiner coupled to the flow direction detector and operable to provide at least one control signal in the event at least one of undesirable forward flow and undesirable back flow of water is determined;

a controller coupled to the flow direction determiner for receiving at least one control signal, the controller being adapted to provide a valve close signal in response to the occurrence of the at least one control signal;

a valve coupled to the controller and adapted to interrupt the flow of water through the water supply pipe in response to the valve close signal; and an electrical switch adapted to shut off the electrical power to the water heater in response to a power off signal, the controller being coupled to the electrical switch and being adapted to cause the delivery of the power off signal to the electrical switch in the event the flow of water through the water flow pipe has been interrupted in response to the valve close signal.

15. An apparatus according to claim 14 comprising a reset actuator adapted to generate a reset signal upon actuation, the controller being coupled to the reset actuator and the valve also being coupled to the reset actuator, the controller being responsive to the reset signal to cause the re-establishment of power to the water heater and to cause the valve to open.

16. An apparatus according to claim 14 comprising a remote alarm signal generator for providing an alarm signal to a location remote from the building to indicate the interruption of the water flow by the valve in response to the occurrence of at least one of the water flow in the first direction exceeding the first forward flow threshold and the water flow in the second direction exceeding the second back flow threshold.

17. An apparatus according to claim 14 wherein the first forward flow threshold and second back flow threshold are each time thresholds.

18. An apparatus according to claim 17 wherein the first and second thresholds are adjustable.

19. An apparatus according to claim 17 wherein the first threshold is greater than the second threshold.

20. An apparatus according to claim 17 wherein the first threshold is between three and eight hours and the second threshold is between one second and one minute.

21. A method comprising:

interrupting the flow of water to a building and turning off the electric power to an electric water heater upon detection of the forward flow of water through a building water supply pipe for at least a first continuous time period;

interrupting the flow of water to a building and turning off the electric power to an electric water heater upon the detection of the backward flow of water through a building water supply pipe for a second continuous time period;

wherein the first and second continuous time periods are of different durations with the first time period being greater than the second time period.

22. A method according to claim 21 comprising predetermining at least one of the first and second time periods.

23. A method according to claim 21 comprising adjusting at least one of the first and second predetermined time periods.

24. A method according to claim 21 comprising the act of signaling a remote monitoring location to indicate that the flow of water has been interrupted.

25. A method according to claim 21 comprising the act of indicating that the flow of water has been interrupted.

26. A method according to claim 21 comprising the act of selectively reversing the interruption of the flow of water.

27. A method according to claim 21 further comprising the act of selectively manually controlling the closing of a valve to shut off the flow of water in the water supply pipe at a location that is separate from the valve.

28. A method according to claim 21 in which the first time period is between three and eight hours and the second time period is between one second and one minute.

29. An apparatus comprising:

means for detecting the forward flow and backflow of water through a building water supply pipe;

means for interrupting the flow of water through the building water supply pipe upon detection of the forward flow of water through the building water supply pipe for at least a first continuous time period and for interrupting the flow of water to the building through the building water supply pipe upon detection of the backward flow of water for at least a second continuous time period; and means for interrupting the power to a water heater for the building in the event the flow of water through the building water supply pipe is interrupted due to at least one of the forward flow of water through the building water supply pipe for at least a first continuous time period and the backflow of water through the building water supply pipe for at least a second continuous time period, the first continuous time period being greater than the second continuous time period.

* * * * *